United States Patent
Wariishi (12)

(10) Patent No.: US 7,625,636 B2
(45) Date of Patent: Dec. 1, 2009

(54) INSULATING-FILM FORMING COMPOSITION, INSULATING FILM AND PREPARATION PROCESS THEREOF

(75) Inventor: Koji Wariishi, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 380 days.

(21) Appl. No.: 11/522,892

(22) Filed: Sep. 19, 2006

(65) Prior Publication Data

US 2007/0073024 A1   Mar. 29, 2007

(30) Foreign Application Priority Data

Sep. 26, 2005   (JP) .......................... P.2005-278034
Jul. 25, 2006   (JP) .......................... P.2006-202036

(51) Int. Cl.
*B32B 9/04* (2006.01)

(52) U.S. Cl. .......................... 428/447; 528/15; 528/25; 528/31; 524/315; 524/317; 524/356; 524/366; 524/379

(58) Field of Classification Search ........................ None
See application file for complete search history.

(56) References Cited

U.S. PATENT DOCUMENTS 7,507,783 B2 *   3/2009   Meador et al. ................. 528/28

2006/0122351 A1 *   6/2006   Laine et al. ................... 528/31

FOREIGN PATENT DOCUMENTS

JP   2002-338693 A   11/2002
JP   2002-363414 A   12/2002

OTHER PUBLICATIONS

Article entitled "Synthesis of Highly-Functionalized Dendrimers Based on Polyhedral Silsesquioxane Cores" authored by Jaffrès et al., and piublished in J. Chem. Soc., Dalton Trans., 1998, 2767.*
Article entitled "Silsesquioxane Chemistry III. Carbosilane Dendrimers Based on a Cubic Si8O12 Core" authored by Müller et al. and published in Main Group Metal Chemistry (1999), 22(8), 485-488.*
Abstract for the article entitled "Synthesis and Characterization of Chloro-, Allyl, and Ferrocenyl-substituted Silsesquioxanes" authored by Mutluay et al. and published in Organosilicon Chemistry IV: From Molecules to Materials (Lectures and Poster Contributions presented at the Muechner Silicontage), 4th, Muechen, (2000), meeting date 1998, 531-5.*

\* cited by examiner

*Primary Examiner*—Marc S Zimmer
(74) *Attorney, Agent, or Firm*—Sughrue Mion, PLLC

(57) ABSTRACT

An insulating-film forming composition comprising: at least one of: a dendrimer having a core portion and a branched end; and a polymer of the dendrimer; and a coating solvent, wherein the dendrimer has a cage silsesquioxane at the core portion, and has a polymerizable group at the branched end; an insulating film obtained by using the film forming composition; and an electronic device having the insulating film.

11 Claims, No Drawings

INSULATING-FILM FORMING COMPOSITION, INSULATING FILM AND PREPARATION PROCESS THEREOF

BACKGROUND OF THE INVENTION

1. Field of the Invention

The present invention relates to a composition for forming an insulating film which is to be used for electronic devices and the like and is excellent in film properties such as dielectric constant and mechanical strength; and an electronic device having an insulating film obtained using the composition.

2. Description of the Related Art

In recent years, power consumption and delay time have increased because the progress of high integration, multifunction and high performance in the field of electronic materials has led to an increase in circuit resistance and condenser capacity between interconnects. Particularly, an increase of delay time becomes a large factor for the reduction of signal speed of devices and generation of crosstalk so that reduction of parasitic resistance and parasitic capacitance is required in order to reduce this delay time and accelerate the speed of devices. As one concrete measure for reducing this parasitic capacitance, an attempt has been made to cover the periphery of interconnects with a low-dielectric-constant interlayer insulating film. In addition, the interlayer insulating film is expected to have heat resistance high enough to withstand the thin film formation step at the time of producing a mount board and post steps such as chip connection and pin insertion and also chemical resistance high enough to withstand a wet process. Moreover, Al interconnects have recently been replaced by low resistance Cu interconnects and it is therefore common practice to carry out planarization by CMP (chemical mechanical polishing). The interlayer insulating film is therefore required to have mechanical resistance high enough to withstand this process.

Although polybenzoxazole and polyimide are widely known as materials for insulating films, insulating films obtained from them are not satisfactory from the viewpoints of low dielectric constant, low water absorption, durability and hydrolysis resistance because they contain a nitrogen atom having high polarity.

High heat-resistant resins having a polyarylene ether as a main chain are known. They have a dielectric constant falling within a range of from 2.6 to 2.7. In addition, a film obtained by crosslinking polymerization of a cage silsesquioxane having, in the molecule thereof, a plurality of carbon-carbon double bonds is proposed. It has a dielectric constant of from 3.3 to 3.5 (JP-A-2002-363414). A further reduction in a dielectric constant is desired in order to realize a high-speed device.

Use, as a precursor, of a dendrimer, which has an alkoxysilyl group at a branched chain end linked via an amide bond, for an insulating film while making use of a sol-gel reaction is proposed (JP-A-2002-338693). The insulating film thus obtained has however drawbacks such as high dielectric constant, poor heat resistance and high hygroscopic property.

SUMMARY OF THE INVENTION

The present invention relates to a polymer for overcoming the above-described problems. More specifically, the invention pertains to a composition for forming an insulating film which is to be used for electronic devices and the like and is excellent in film properties such as dielectric constant and mechanical strength, an insulating film available by using the insulating-film forming composition, and an electronic device having the film. (An "insulating film" is also referred to as a "dielectric film" or a "dielectric insulating film", and these terms are not substantially distinguished.)

The present inventors have found that the above-described problems can be overcome by the following constitutions.

(1) An insulating-film forming composition comprising:

at least one of: a dendrimer having a core portion and a branched end; and a polymer of the dendrimer; and a coating solvent, wherein the dendrimer has a cage silsesquioxane at the core portion, and has a polymerizable group at the branched end.

(2) The insulating-film forming composition as described in (1) above, wherein the polymerizable group is an ethylenic double bond or an acetylenic triple bond.

(3) The insulating-film forming composition as described in (1) or (2) above, wherein the dendrimer is represented by formula (1):

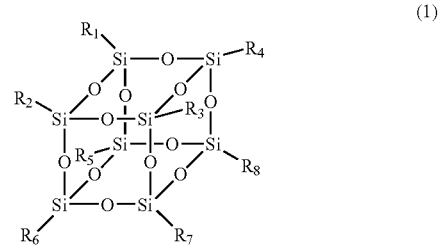

wherein $R_1$ to $R_8$ each independently represents an alkyl, alkenyl or aryl group or a substituent represented by formula (2) with the proviso that at least one of $R_1$ to $R_8$ is a substituent represented by formula (2):

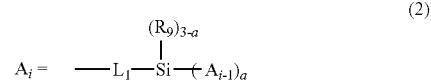

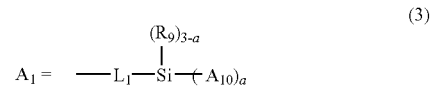

wherein $L_1$ represents an alkylene group, —O— or —Si($R_{11}$)($R_{12}$)— or a divalent linking group which is a combination thereof;

$R_{11}$ and $R_{12}$ each independently represents an alkyl group;

$R_9$ represents an alkyl or aryl group; and i represents an integer of from 1 to 10, and wherein when i represents 1, the substituent represented by formula (2) is $A_1$ represented by formula (3):

wherein a represents an integer of from 1 to 3; and $R_{10}$ represents an alkenyl or alkynyl group, with the proviso that where a plurality of $L_1$'s, $R_9$'s or $R_{10}$'s are present, the plurality of $L_1$'s, $R_9$'s or $R_{10}$'s may be the same or different.

(4) The insulating-film forming composition as described in (3) above, wherein i represents an integer of from 1 to 5.

(5) The insulating-film forming composition as described in (3) or (4) above, wherein a represents 2 or 3.

(6) The insulating-film forming composition as described in any of (3) to (5) above, wherein $R_{10}$ represents a vinyl or allyl group.

(7) The insulating-film forming composition as described in any of (1) to (6) above, which further comprises a polymerization initiator.

(8) The insulating-film forming composition as described in any of (1) to (7) above, wherein the dendrimer is free of a nitrogen atom.

(9) An insulating film formed from an insulating-film forming composition as described in any of (1) to (8) above.

(10) An electronic device comprising an insulating film as described in (9) above.

(11) A process for producing an insulating film, which comprises:

applying an insulating-film forming composition as described in any of (1) to (8) above onto a substrate; and curing the applied insulating-film forming composition.

DETAILED DESCRIPTION OF THE INVENTION

The present invention will be described in detail.

The dendrimer which will be described herein is a highly branched multi-branched polymer or tree-like branched polymer having a core portion, a branch portion and an end portion, for example, as described in JP-A-2002-338693. The dendrimer of the invention is characterized in that its core portion has a cage silsesquioxane structure. Examples of the cage silsesquioxane structure include $T^3_8$ structure, $T^3_{10}$ structure and $T^3_{12}$ structure. Of these, $T^3_8$ structure is preferred.

Use of the dendrimer of the invention or a polymer derived therefrom makes it possible to obtain a film having thermal stability and a sufficiently low dielectric constant.

The end group of the dendrimer of the invention has a polymerizable group. The term "polymerizable group" means a substituent which can be polymerized using heat, light, acid or base. It contains preferably an ethylenic unsaturated group (for example, vinyl, allyl, acryloyl, methacryloyl or styryl group) or an acetylenic unsaturated group, more preferably an ethylenic unsaturated group, especially preferably a vinyl or allyl group.

A dendrimer is expressed as a dendrimer of an n-th generation, depending on the number (n) of repeated branched structures. The dendrimer of the invention includes even a dendrimer of 0-th generation. The specific example (1-1) which will be described later corresponds to a dendrimer of the 0-th generation, while the specific example (1-2) corresponds to a dendrimer of the first generation.

The dendrimer is preferably that of from the 0-th to the 10-th generation, more preferably that of from the 0-th to the 8-th generation, still more preferably that of from 0-th to 5-th generation, especially preferably from 0-th to 3-rd generation. The dendrimer has an average molecular weight of from 500 to 1000000, more preferably from 550 to 50000, especially preferably from 600 to 50000.

The dendrimer of the invention represented by the following formula (1) is especially preferred.

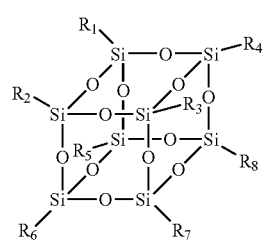

In the formula (1), $R_1$ to $R_8$ each independently represents an alkyl group, an alkenyl group, an aryl group, or a substituent represented by the following formula (2):

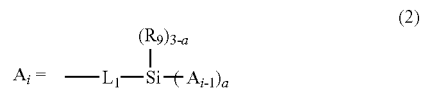

The alkyl group represented by $R_1$ to $R_8$ is preferably a $C_{1-10}$ alkyl group which may be linear, branched or cyclic (for example, methyl, t-butyl, cyclopentyl or cyclohexyl).

The alkenyl group which is represented by $R_1$ to $R_8$ is preferably a $C_{2-10}$ alkenyl group (for example, vinyl or propenyl).

The aryl group which is represented by $R_1$ to $R_8$ is preferably a $C_{6-20}$ aryl group (for example, phenyl, 1-naphthyl or 2-naphthyl) $R_1$ to $R_8$ is more preferably the alkyl or alkenyl group, especially preferably the alkyl group.

These substituents may be substituted with another substituent.

In the formula (2), $L_1$ represents an alkylene group, —O— or —Si($R_{11}$)($R_{12}$)— or a divalent linking group which is a combination thereof, preferably an alkylene group, more preferably ethylene or propylene.

$R_{11}$ and $R_{12}$ each independently represents an alkyl group, preferably a $C_{1-10}$ alkyl group, more preferably a $C_{1-5}$ alkyl group, especially preferably a methyl group.

$R_9$ represents an alkyl or aryl group. Preferred examples of the alkyl or aryl group represented by $R_9$ are similar to those represented by $R_1$ to $R_8$.

"i" represents an integer of from 1 to 10, preferably an integer of from 1 to 8, more preferably an integer of from 1 to 5, especially preferably an integer of from 1 to 3.

"a" represents an integer of from 1 to 3. From the standpoint of mechanical strength of the resulting film, a polymerizable group having a higher extent of branching is preferred so that "a" is preferably an integer of 2 or 3, especially preferably 3.

At least one of $R_1$ to $R_8$ is a group represented by the formula (2) and when i represents an integer of 2 or greater, at least one of $R_1$ to $R_8$ is a group represented by the formula (2) and has, at an end thereof, a group represented by the formula (3) as $A_1$.

Of $R_1$ to $R_8$, preferably two to eight groups, more preferably four to eight groups, especially preferably all the groups are represented by the formula (2).

When i represents 1, a group represented by the formula (2) is $A_1$, that is, a group represented by the formula (3).

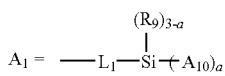
(3)

$R_{10}$ represents an alkenyl or alkynyl group.

The preferred examples of the alkenyl group represented by $R_{10}$ are similar to those of the alkenyl group represented by $R_1$ to $R_8$.

The alkynyl group represented by $R_{10}$ is preferably a $C_{2-10}$ alkynyl group such as ethynyl and phenylethynyl, more preferably a $C_{2-5}$ alkynyl group, especially preferably an ethynyl group.

The term "dendrimer" as used herein also embraces a highly regular dendrimer having a monodisperse molecular weight distribution and a so-called hyperbranched dendrimer which has low regularity and a polydisperse molecular weight distribution.

The dendrimer according to the present invention free of a nitrogen atom is especially preferred from the viewpoints of dielectric constant and hygroscopicity of the film. It is still more preferred that the dendrimer is a compound other than polyimide or polyamide, in other words, a compound having neither polyimide bond nor polyamide bond.

Specific examples of the formula (1) will next be described, but it is not limited to them.

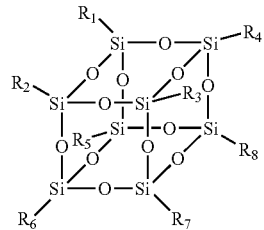

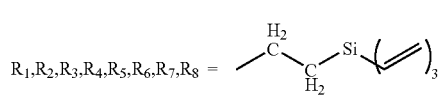
(I-1)

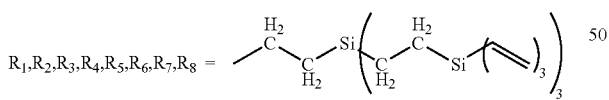
(I-2)

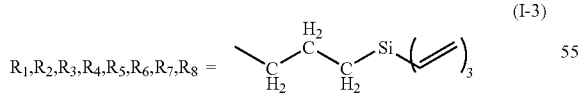
(I-3)

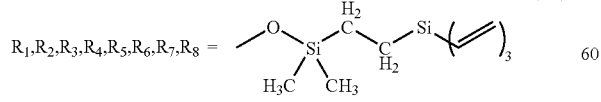
(I-4)

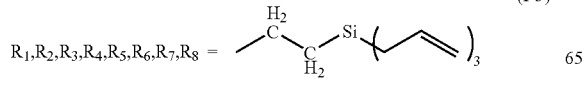
(I-5)

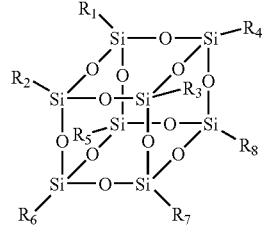

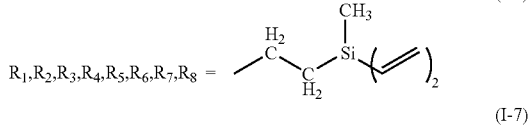
(I-6)

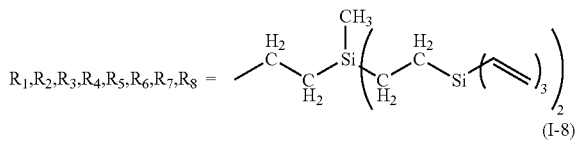
(I-7)

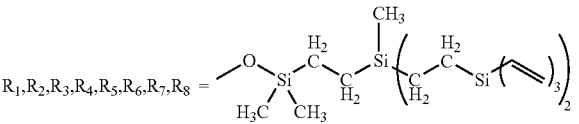
(I-8)

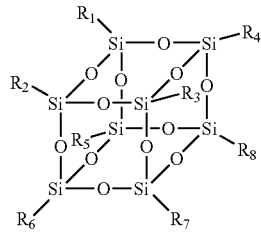

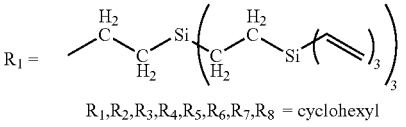
(I-9)

$R_1, R_2, R_3, R_4, R_5, R_6, R_7, R_8$ = cyclohexyl

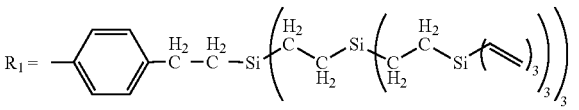
(I-10)

$R_2, R_3, R_4, R_5, R_6, R_7, R_8$ = i-butyl

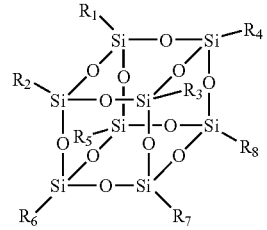

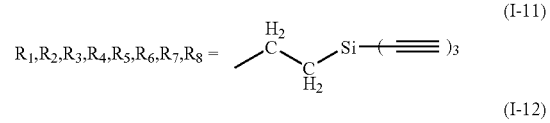
(I-11)

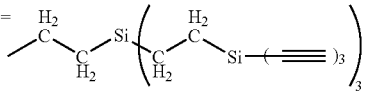
(I-12)

-continued

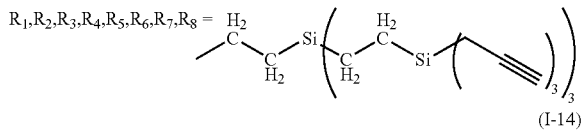

(I-13)

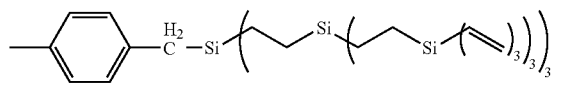

(I-14)

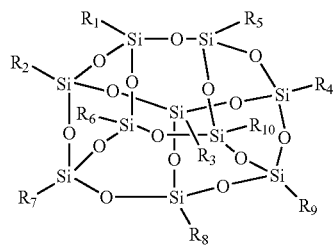

(I-15)

$R_1$—$R_{10}$ = —CH$_2$CH$_2$Si(CH=CH$_2$)$_3$

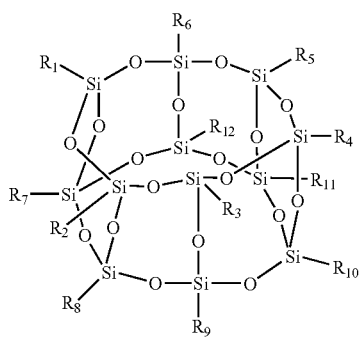

(I-16)

$R_1$—$R_{12}$ = —CH$_2$CH$_2$Si(CH=CH$_2$)$_3$

The dendrimer represented by the formula (1) can easily be prepared using the technology known widely in the chemistry of silicon. It can be synthesized, for example, by the process as described in *J. Chem. Soc., Dalton Trans.*, 2767(1998).

The polymer of the dendrimer Y represented by the formula (1) may be synthesized in a solvent or in a solventless manner.

Any solvent can be used for the polymerization reaction insofar as it can dissolve therein the raw material monomer at a required concentration and it has no adverse effect on the properties of the film prepared from the polymer. Examples of the solvent usable for the reaction include water; alcohol solvents such as methanol, ethanol, propanol and propylene glycol monomethyl ether: ketone solvents such as alcohol acetone, methyl ethyl ketone, methyl isobutyl ketone, cyclohexanone and acetophenone; ester solvents such as ethyl acetate, butyl acetate, propylene glycol monomethyl ether acetate, γ-butyrolactone and methyl benzoate; ether solvents such as dibutyl ether and anisole; aromatic hydrocarbon solvents such as toluene, xylene, mesitylene and 1,3,5-triisopropylbenzene; amide solvents such as N-methylpyrrolidinone and dimethylacetamide; halogen solvents such as carbon tetrachloride, dichloromethane, chloroform, 1,2-dichloroethane, chlorobenzene, 1,2-dichlorobenzene and 1,2,4-trichlorobenzene; and aliphatic hydrocarbon solvents such as hexane, heptane, octane and cyclohexane. Of these, acetone, methyl ethyl ketone, methyl isobutyl ketone, cyclohexanone, acetophenone, ethyl acetate, propylene glycol monomethyl ether, propylene glycol monomethyl ether acetate, γ-butyrolactone, anisole, tetrahydrofuran, toluene, xylene, mesitylene, 1,3,5-trisopropylbenzene, 1,2-dichloroethane, chlorobenzene, 1,2-dichlorobenzene, and 1,2,4-trichlorobenzene are more preferred; tetrahydrofuran, γ-butyrolactone, anisole, toluene, xylene, mesitylene, 1,3,5-triisoprpylbenzene, 1,2-dichloroethane, chlorobenzene, 1,2-dichlorobenzene, and 1,2,4-trichlorobenzene are still more preferred; and γ-butyrolactone, anisole, mesitylene, 1,3,5-triisopropylbenzene, 1,2-dichlorobenzene, and 1,2,4-trichlorobenzene are especially preferred. These solvents may be used either singly or in combination.

The solvent for reaction has preferably a boiling point of 50° C. or greater, more preferably 60° C. or greater, especially preferably 70° C. or greater.

The concentration of the dendrimer or polymer thereof in the reaction mixture is preferably from 0.01 to 50 mass %, more preferably from 0.1 to 20 mass %, especially preferably from 0.3 to 10 mass %. (In this specification, mass ratio is equal to weight ratio.)

The dendrimer of the invention is polymerized by heating and/or exposure to radiation.

When a polymer is prepared by thermal polymerization, it may be polymerized only by heating or after adding an initiator or a catalyst. From the viewpoint of the purity of the polymer thus obtained, polymerization only by heating is preferred.

(Polymerization Initiator)

When the initiator is employed, it is preferred to add a polymerization initiator in an amount of from 0.1 to 50 mass % relative to the whole monomer. Examples of the polymerization initiator include azobis compounds, peroxides, hydroperoxides and redox catalysts, more specifically, t-butyl peroxide, potassium persulfate, ammonium persulfate, tert-butyl peroctoate, tert-butyl oxypivalate, benzoyl peroxide, isopropyl percarbonate, 2,4-dichlorobenzoyl peroxide, methyl ethyl ketone peroxide, cumene hydroperoxide, dicumyl peroxide, azobisisobutyronitrile, and 2,2-azobis(2-amidinopropane)hydrochloride.

(Catalyst)

Metal catalysts may be used as the catalyst. Preferred examples of the catalyst include Pd catalysts such as Pd(PPh$_3$)$_4$, bis(benzonitrile)palladium chloride, and Pd(OAc)$_2$, Ziegler-Natta catalysts, Ni catalysts such as nickel acetylacetonate, W catalysts such as WCl$_6$, Mo catalysts such as MoCl$_5$, Ta catalysts such as TaCl$_5$, Nb catalysts such as NbCl$_5$, Rh catalysts and Pt catalysts. Of these, Pd catalysts are preferred because they prevent gelation of the polymer and permit selective preparation of a soluble polymer.

The optimum conditions for the polymerization reaction in the invention vary, depending on the presence or absence of the catalyst, amount of the catalyst, kind of the solvent, concentration and the like. The polymerization reaction is carried out preferably at an internal temperature of from 0 to 230° C., more preferably from 50 to 200° C., especially preferably from 70 to 150° C., preferably for from 30 minutes to 50 hours, more preferably for from 1 to 20 hours, especially preferably for from 2 to 10 hours. The reaction is preferably effected in an inert gas atmosphere (such as nitrogen or argon) in order to prevent the oxidative decomposition of the polymer.

The oxygen concentration at the time of the reaction is preferably 100 ppm or less, more preferably 50 ppm or less, especially preferably 20 ppm or less.

The polymer obtained by the polymerization has a mass average molecular weight preferably falling within a range of from 1000 to 500000, more preferably from 5000 to 300000, especially preferably from 10000 to 200000.

When a polymer matrix is formed by the polymerization of the dendrimer of the invention through exposure to radiation, exposure to active rays such as ultraviolet light, visible light, electron beam and γ ray is employed. In the case of ultraviolet visible light, a polymerization time can be reduced by the addition, in advance, of a radiation polymerization initiator in an amount of from 0.01 to 5 mol % relative to the whole monomer.

As the radiation polymerization initiator, known ones can be used. Examples include carbonyl compounds, azobis compounds, peroxides, sulfur compounds, halogen compounds, redox compounds and cationic polymerization initiators, more specifically, benzoin, 2-methylbenzoin, trimethylsilyl-benzoin, 4-methoxybenzophenone, Michler's ketone, benzoin methyl ether, acetophenone, anthraquinone, benzyl-2-chlorothioxanton, 2,2-dimethoxy-2-phenylacetophenone, benzoyl peroxide, azobispropane, thiphenol, 2-bromopropane, 1-chloromethylnaphthalene, p-methoxyphenyl-2,4-dichloromethyl-1,3,5-triazine, benzophenone/triethanolamine, 2-stilbene-4,6-trichloromethyl-1,3,5-triazine, and diphenyliodonium tetrafluoroborate.

The dendrimers according to the invention or polymers thereof may be used either singly or in combination.

The film forming composition of the invention contains at least the dendrimer of the invention and/or polymer thereof and a coating solvent. It may further contain the above-described initiator for curing the film.

No particular limitation is imposed on the preferable coating solvent usable in the invention. Examples of it include alcohol solvents such as methanol, ethanol, isopropanol, 1-butanol, 2-ethoxymethanol and 3-methoxypropanol; ketone solvents such as acetone, acetylacetone, methyl ethyl ketone, methyl isobutyl ketone, 2-pentanone, 3-pentanone, 2-heptanone, 3-heptanone and cyclohexanone; ester solvents such as ethyl acetate, propyl acetate, butyl acetate, isobutyl acetate, pentyl acetate, ethyl propionate, propyl propionate, butyl propionate, isobutyl propionate, propylene glycol monomethyl ether acetate, methyl lactate, ethyl lactate and γ-butyrolactone; ether solvents such as diisopropyl ether, dibutyl ether, ethyl propyl ether, anisole, phenetole, and veratrole; aromatic hydrocarbon solvents such as mesitylene, ethyl benzene, diethyl benzene, propyl benzene and 1,2-dichlorobenzene; and amide solvents such as N-methylpyrrolidinone and dimethylacetamide. These solvents may be used either singly or in combination.

Of these, acetone, propanol, cyclohexanone, propylene glycol monomethyl ether, propylene glycol monomethyl ether acetate, methyl lactate, ethyl lactate, γ-butyrolactone, anisole, mesitylene and 1,2-dichlorobenzene are more preferred, with cyclohexanone, propylene glycol monomethyl ether, propylene glycol monomethyl ether acetate, γ-butyrolactone and anisole being especially preferred.

The solid concentration of the film forming composition of the invention is preferably from 3 to 50 mass %, more preferably from 3 to 35 mass %, especially preferably from 5 to 20 mass %.

The polymer of the invention preferably contains, as an impurity, metals in an amount as small as possible. The metal content is preferably 10 ppm or less, more preferably 1 ppm or less, especially preferably 100 ppb or less.

The film forming composition of the invention may contain an additive such as nonionic surfactant, fluorinated nonionic surfactant, silane coupling agent and adhesive within a range which does not damage the properties (heat resistance, dielectric constant, mechanical strength, coating properties, adhesion and the like) of the insulating film thus obtained.

Examples of the nonionic surfactant include octyl polyethylene oxide, decyl polyethylene oxide, dodecyl polyethylene oxide, octyl polypropylene oxide, decyl polypropylene oxide and dodecyl polypropylene oxide. Examples of the fluorinated nonionic surfactant include perfluorooctyl polyethylene oxide, perfluorodecyl polyethylene oxide and perfluorododecyl polyethylene oxide. Examples of the silane coupling agent include vinyltrimethoxysilane, vinyltriethoxysilane, vinyltriacetoxysilane, allyltrimethoxysilane, allyltriethoxysilane, divinyldiethoxysilane and trivinylethoxysilane.

The total amount of these additives may fall within an appropriate range, which varies, depending on the using purpose of the additives or solid concentration of the coating solution. In general, their amount is preferably from 0.001 to 10%, more preferably from 0.01 to 5%, especially preferably from 0.05 to 2%, each in terms of mass % in the coating solution.

It is possible to add a pore forming agent (foaming agent) to the film forming composition of the invention within an amount not impairing the required mechanical strength of the resulting film, thereby making the film porous and reducing its dielectric constant.

No particular limitation is imposed on the pore forming agent, but nonmetallic compounds are preferred. They preferably satisfy both the solubility in a solvent to be used for a coating solution and compatibility with the polymer of the invention.

The pore forming agent has a boiling point or decomposition point of preferably from 100 to 500° C., more preferably from 200 to 450° C., especially preferably from 250 to 400° C. It has a molecular weight of preferably from 200 to 50000, more preferably from 300 to 10000, especially preferably from 400 to 5000. The amount of it is preferably from 0.5 to 75%, more preferably from 0.5 to 30%, especially preferably from 1 to 20%, each by mass.

The polymer containing therein a decomposable group may be used as the pore forming agent. The decomposition temperature of it is preferably from 100 to 500° C., more preferably from 200 to 450° C., especially preferably from 250 to 400° C. The content of the decomposable group in the film forming polymer is preferably from 0.5 to 75%, more preferably from 0.5 to 30%, especially preferably from 1 to 20%, in terms of mol %.

Examples of the polymer usable as the pore forming agent include polyvinyl aromatic compounds (such as polystyrene, polyvinyl pyridine, and halogenated polyvinyl aromatic compounds), polyacrylonitrile, polyalkylene oxides (such as polyethylene oxide and polypropylene oxide), polyethylene, polylactic acid, polysiloxane, polycaprolactone, polycaprolactam, polyurethane, polymethacrylates (such as polymethyl methacrylate), polymethacrylic acid, polyacrylates (such as polymethyl acrylate), polyacrylic acid, polydienes (such as polybutadiene and polyisoprene), polyvinyl chloride, polyacetal and amine capped alkylene oxides.

Additional examples include polyphenylene oxide, poly (dimethylsiloxane), polytetrahydrofuran, polycyclohexylethylene, polyethyloxazoline, polyvinylpyridine, and polycaprolactone.

Of these, polystyrenes are preferred as the pore forming agent. The polystyrenes include anionic polymerized polystyrene, syndiotactic polystyrene, and unsubstituted or substituted polystyrenes (such as poly(α-methylstyrene)), with unsubstituted polystyrenes being preferred.

Examples of the thermoplastic pore forming polymer include polyacrylates, polymethacrylates, polybutadiene, polyisoprene, polyphenylene oxide, polypropylene oxide, polyethylene oxide, poly(dimethylsiloxane), polytetrahydrofuran, polyethylene, polycyclohexylethylene, polyethyloxazoline, polycaprolactone, polylactic acid and polyvinylpyridine.

The film available by using the film forming composition of the invention can be formed by applying the film forming composition to a substrate by any method such as spin coating, roller coating, dip coating and scan coating and then removing the solvent by heat treatment. Although no particular limitation is imposed on the heat treatment method, ordinarily employed methods such as hot plate heating, method using a furnace, and heating by exposing to the light of a xenon lamp in RTP (Rapid Thermal Processor) or the like can be employed.

It is especially preferred to apply the film forming composition of the invention onto a substrate and then heating to cure the film. For this purpose, the polymerization reaction of a double bond or triple bond remaining in the polymer at the time of post heating may be utilized. The film forming composition may therefore contain the above-described initiator for the purpose of polymerizing these polymerizable groups. The post heat treatment is performed preferably at from 100 to 450° C., more preferably at from 200 to 420° C., especially preferably at from 350 to 400° C., preferably for from 1 minute to 2 hours, more preferably for from 10 minutes to 1.5 hours, especially preferably for from 30 minutes to 1 hour.

The post heat treatment may be performed over several times. This post heat treatment is performed especially preferably in a nitrogen atmosphere in order to prevent thermal oxidation due to oxygen.

The film available using the film forming composition of the invention can be used for various purposes. It is suited as an insulating film in electronic parts such as semiconductor devices and multilayer wiring boards for multi-chip module. It can be used not only as an interlayer insulating film for semiconductor, surface protecting film, and buffer coating film, but also a passivation film in LSI, α-ray shielding film, cover lay film of a flexo printing plate, overcoat film, cover coat for a flexible copper clad plate, solder resist film or liquid crystal alignment film.

In addition, it can be used as a conductive film after giving conductivity thereto by doping an electron donor or acceptor into the film of the invention.

EXAMPLES

The below-described examples are merely exemplary of the invention and are not intended to limit the scope of the invention.

Example 1

Compound (1-1) was synthesized in accordance with the synthesis process as described in *J. Chem. Soc., Dalton Trans.*, 2627(1998).

Next, 2 g of the Compound (1-1), 0.2 g of t-butyl oxypivalate and 400 ml of ethyl acetate were heated and refluxed under stirring for 3 hours in a nitrogen gas stream. After the reaction mixture was cooled to room temperature, an insoluble matter was filtered out and the filtrate was concentrated under reduced pressure. To the residue was added 200 ml of methanol. A solid thus precipitated was filtered and washed with methanol to yield 1.6 g of Polymer (A).

A coating solution was prepared by completely dissolving 1.0 g of Polymer (A) in 9.0 g of cyclohexanone at room temperature. The resulting solution was filtered through a 0.1-µm filter made of tetrafluoroethylene and then, spin-coated on a silicon wafer. The film thus coated was heated on a hot plate at 250° C. for 60 seconds in a nitrogen gas stream, followed by calcining for 60 minutes in an oven of 400° C. purged with nitrogen. As a result, a 0.5-µm thick uniform film free from seeding was obtained. The dielectric constant of the film calculated from the capacitance value at 1 MHz determined using a mercury probe (product of Four Dimensions) and "HP4285 ALCR meter" (product of Yokogawa Hewlett Packard) was 2.46. The Young' modulus was measured using "Nanoindenter SA2" (product of MTS), resulting in 7.5 GPa. The dielectric constant and Young's modulus were measured at 25° C., which will equally apply to the following examples.

Example 2

Compound (1-2) was synthesized in accordance with the synthesis process as described in *J. Chem. Soc., Dalton Trans.*, 2627(1998). Next, 5 g of the Compound (1-2), 0.25 g of dicumyl peroxide and 25 ml of 1,2-dichlorobenzene were stirred for 40 minutes at 120° C. in a nitrogen gas stream. After the reaction mixture was cooled to room temperature, an insoluble matter was filtered out. To the filtrate was added 200 ml of methanol. A solid thus precipitated was filtered, and washed with methanol to yield 2.6 g of Polymer (B).

A coating solution was prepared by completely dissolving 1.0 g of Polymer (B) in 9.0 g of cyclohexanone at room temperature. The resulting solution was filtered through a 0.1-µm filter made of tetrafluoroethylene and then, spin-coated on a silicon wafer. The film thus coated was heated on a hot plate at 250° C. for 60 seconds in a nitrogen gas stream, followed by calcining for 60 minutes in an oven of 400° C. purged with nitrogen. As a result, a 0.5-µm thick uniform film free from seeding was obtained. The dielectric constant of the film calculated from the capacitance value at 1 MHz determined using a mercury probe (product of Four Dimensions) and "HP4285 ALCR meter" (product of Yokogawa Hewlett Packard) was 2.43. The Young' modulus was measured using "Nanoindenter SA2" (product of MTS), resulting in 8.1 GPa.

Example 3

The Compound (1-1) (1 g), 0.1 g of dicumyl peroxide and 10 ml of 1,2-dichlorobenzene were stirred at 140° C. for 30 minutes in a nitrogen gas stream. The reaction mixture was cooled to room temperature, filtered through a 0.1-µm filter made of tetrafluoroethylene and then, spin-coated on a silicon wafer. The film thus coated was heated on a hot plate at 250° C. for 60 seconds in a nitrogen gas stream, followed by calcining for 60 minutes in an oven of 400° C. purged with nitrogen. As a result, a 0.5-µm thick uniform film free from seeding was obtained. The dielectric constant of the film calculated from the capacitance value at 1 MHz determined using a mercury probe (product of Four Dimensions) and "HP4285 ALCR meter" (product of Yokogawa Hewlett Packard) was 2.45. The Young' modulus was measured using "Nanoindenter SA2" (product of MTS), resulting in 7.3 GPa.

Examples 4 to 7

In a similar manner to Example 3 except for the use of each of the compounds described in Table 1 instead of Compound (1-1), a film was prepared. The film thus obtained has properties as shown in Table 1.

TABLE 1

| | Compound | Dielectric constant | Young's modulus (GPa) |
|---|---|---|---|
| Example 4 | 1-4 | 2.48 | 7.0 |
| Example 5 | 1-5 | 2.45 | 7.4 |
| Example 6 | 1-7 | 2.45 | 7.3 |
| Example 7 | 1-11 | 2.46 | 7.5 |

Comparative Example 1

In a 300-ml eggplant-shaped flask were charged 70.5 g of vinyltriethoxysilane and 145.2 g of propylene glycol monomethyl ether. After the addition of 24.8 ml of a 0.4 mass % aqueous nitric acid solution, the resulting mixture was stirred at room temperature for 5 hours.

The reaction mixture was filtered through a 0.1-μm filter made of PTFE and spin coated on a silicon wafer. The film was heated at 250° C. for 60 seconds on a hot plate in a nitrogen gas stream, and then calcined for 60 minutes in an oven of 400° C. purged with nitrogen. As a result, a 0.5-μm thick uniform film free from seeding was obtained. The dielectric constant of the film calculated from the capacitance value at 1 MHz determined using a mercury probe (product of Four Dimensions) and "HP4285 ALCR meter" (product of Yokogawa Hewlett Packard) was 3.4. The Young' modulus was measured using "Nanoindenter SA2", product of MTS, resulting in 6.5 GPa.

It has been understood that compared with the polymer obtained in Comparative Example, the polymers of the invention are excellent in dielectric constant and Young's modulus.

A film formed using a film forming composition containing a dendrimer having a cage structure and/or a polymer obtained by polymerizing the dendrimer, and a coating solvent has a low dielectric constant and high mechanical strength so that it is suited as an interlayer insulating film in an electronic device or the like.

The entire disclosure of each and every foreign patent application from which the benefit of foreign priority has been claimed in the present application is incorporated herein by reference, as if fully set forth.

What is claimed is:

1. An insulating-film forming composition comprising:
a coating solvent, and
at least one of: (i) a dendrimer having a core portion and a branched end, and (ii) a polymer of the dendrimer;
wherein the dendrimer is represented by formula (1):

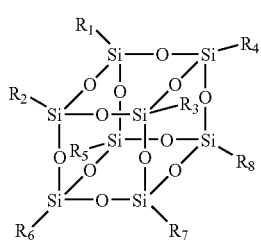

(1)

wherein $R_1$ to $R_8$ each independently represents an alkyl, alkenyl or aryl group or a substituent represented by formula (2) with the proviso that at least one of $R_1$ to $R_8$ is a substituent represented by formula (2):

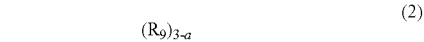

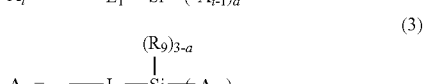

wherein $L_1$ represents an alkylene group, —O— or —Si$(R_{11})(R_{12})$— or a divalent linking group which is a combination thereof;
$R_{11}$ and $R_{12}$ each independently represents an alkyl group;
$R_9$ represents an alkyl or aryl group; and
i represents an integer of from 1 to 10, and wherein when i represents 1, the substituent represented by formula (2) is $A_1$ represented by formula (3):
wherein a represents 2 or 3; and
$R_{10}$ represents an alkenyl or alkynyl group, with the proviso that where a plurality of $L_1$'s, $R_9$'s or $R_{10}$'s are present, the plurality of $L_1$'s, $R_9$'s or $R_{10}$'s may be the same or different; and
the coating solvent is at least one selected from the group consisting of acetone, propanol, cyclohexanone, propylene glycol monomethyl ether, propylene glycol monomethyl ether acetate, methyl lactate, ethyl lactate, γ-butyrolactone, anisole, mesitylene and 1,2-dichlorobenzene.

2. The insulating-film forming composition according to claim 1, wherein the polymerizable group is an ethylenic double bond or an acetylenic triple bond.

3. The insulating-film forming composition according to claim 1, wherein i represents an integer of from 1 to 5.

4. The insulating-film forming composition according to claim 1, wherein $R_{10}$ represents a vinyl or allyl group.

5. The insulating-film forming composition according to claim 1, which further comprises a polymerization initiator.

6. An insulating film formed from an insulating-film forming composition according to claim 1.

7. An electronic device comprising an insulating film according to claim 6.

8. A process for producing an insulating film, which comprises:
applying an insulating-film forming composition according to claim 1 onto a substrate; and
curing the applied insulating-film forming composition.

9. The insulating-film forming composition according to claim 1, wherein the coating solvent is at least one selected from the group consisting of cyclohexanone, propylene glycol monomethyl ether, propylene glycol monomethyl ether acetate, γ-butyrolactone and anisole.

10. The insulating-film forming composition according to claim 1, wherein the variable a represents 3.

11. The insulating-film forming composition according to claim 1, said composition having a solid concentration of from 5 to 20 mass %.

* * * * *